United States Patent Office 3,517,833
Patented June 30, 1970

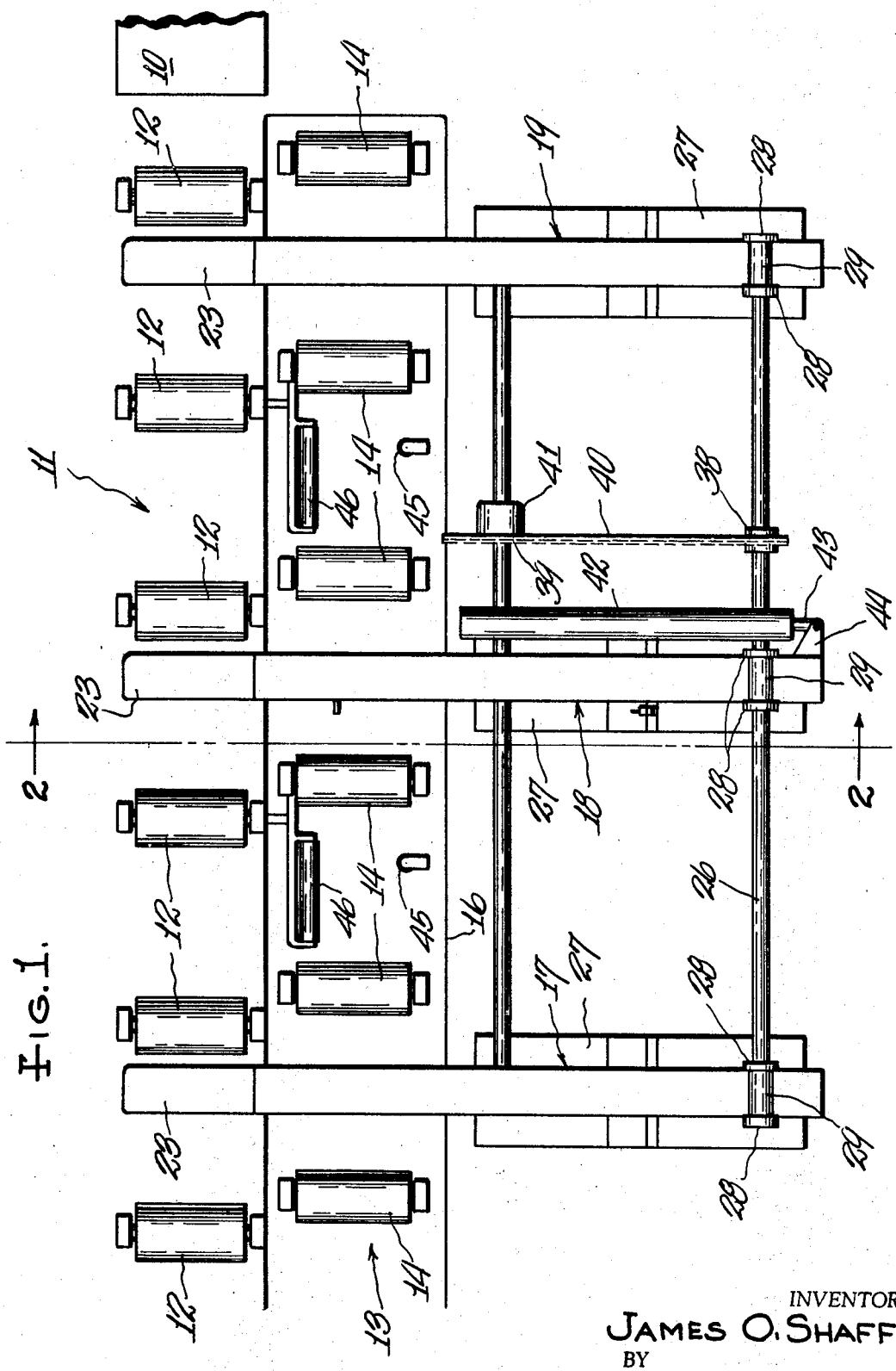

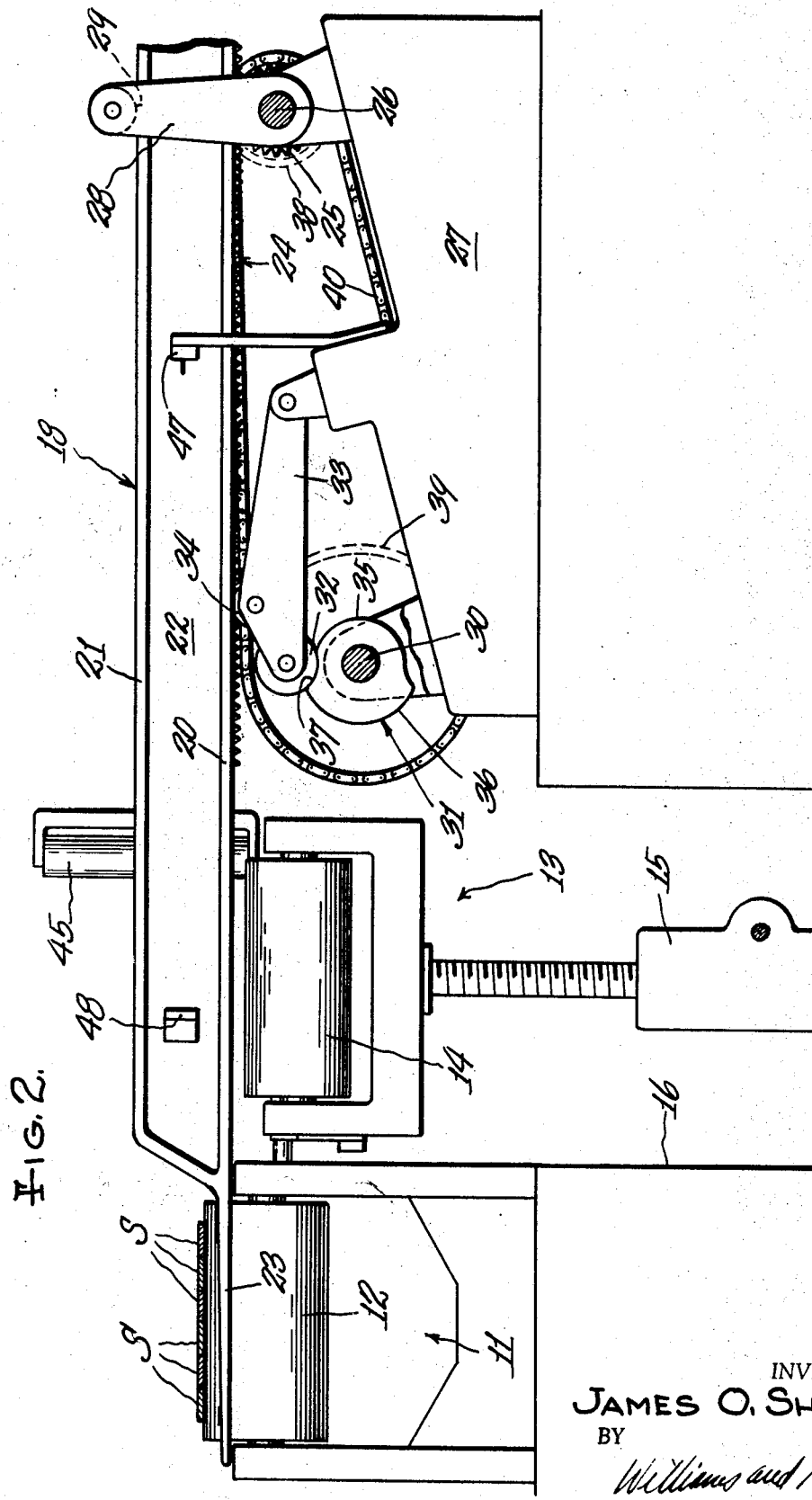

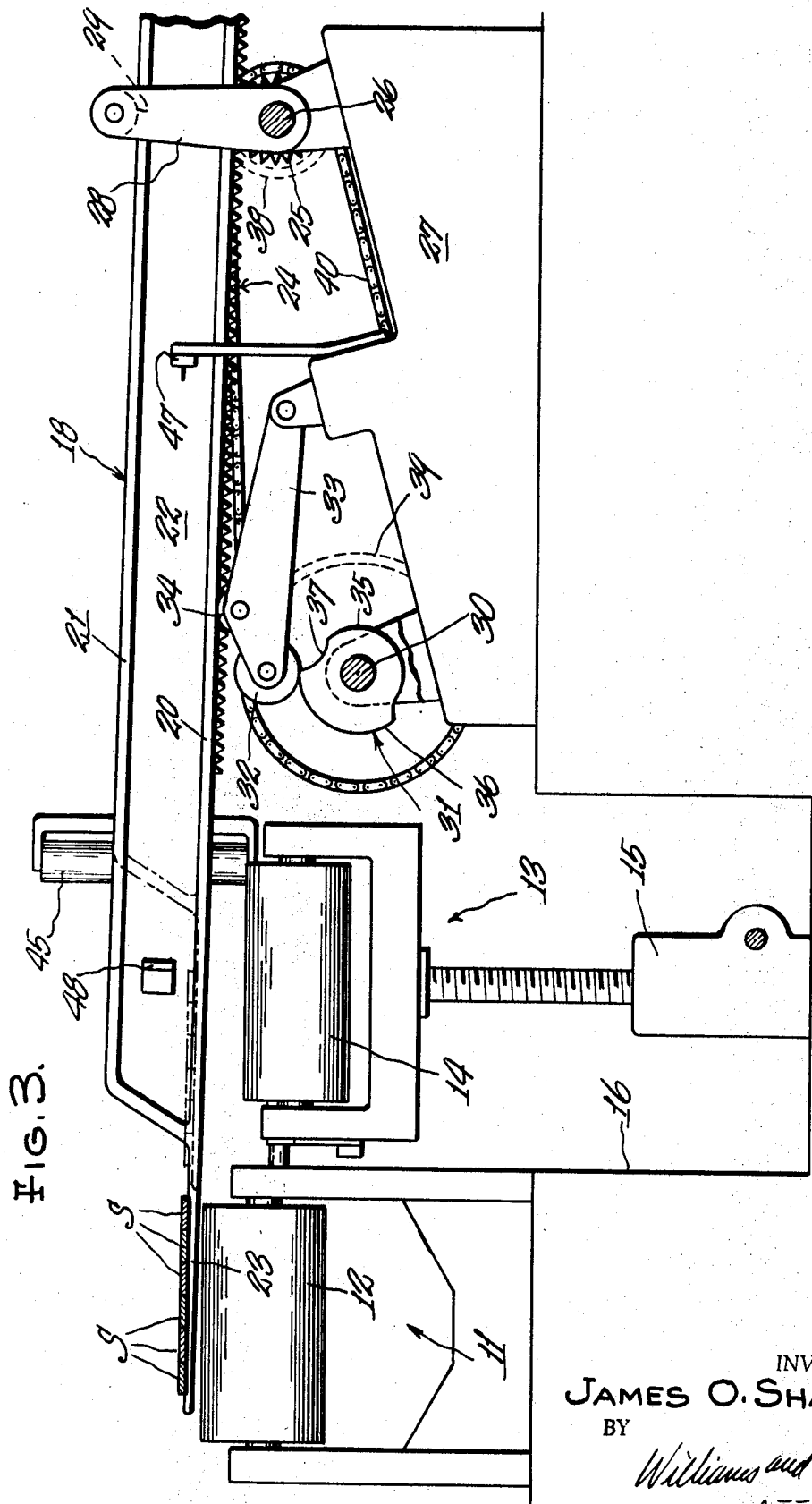

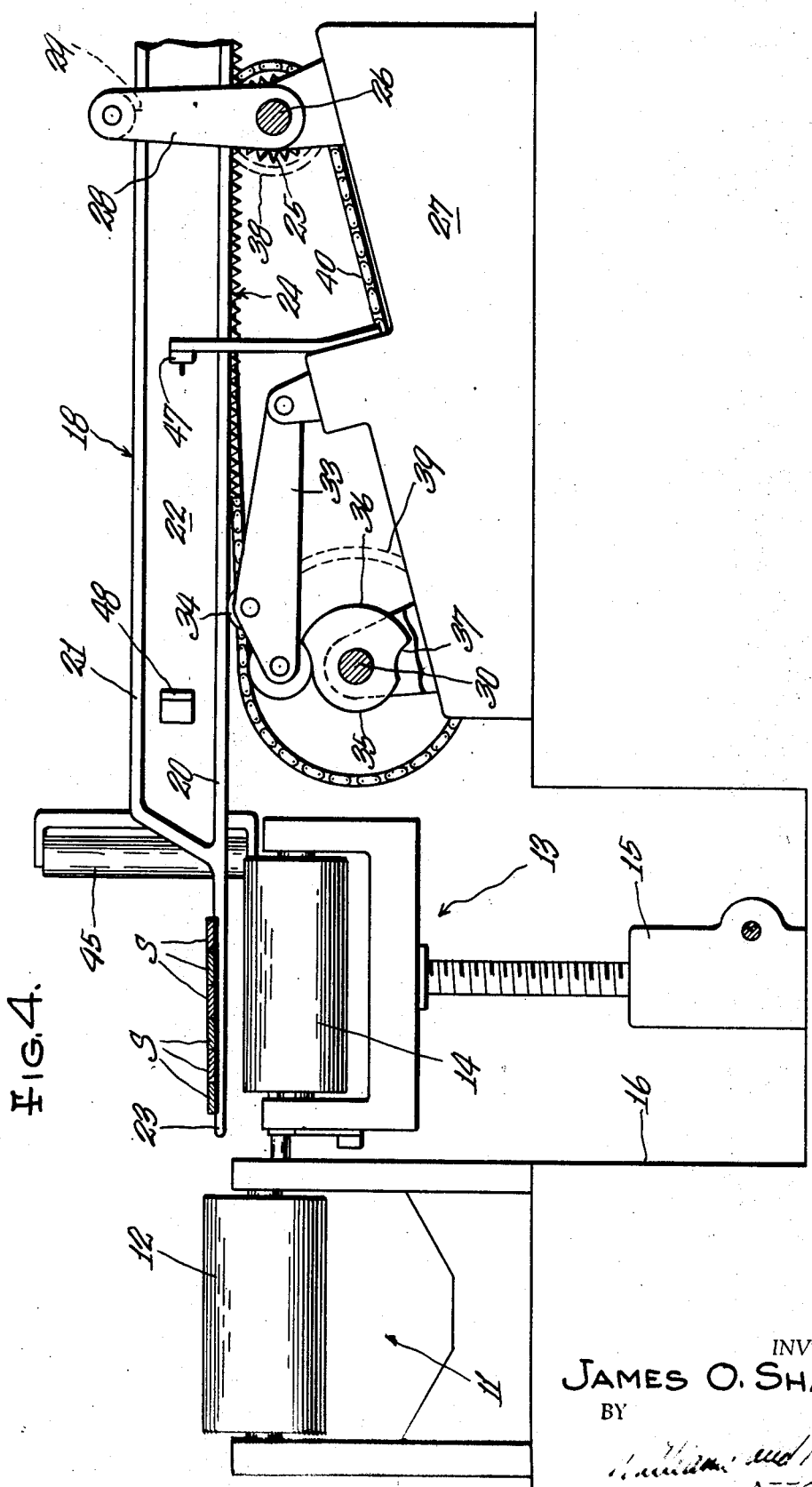

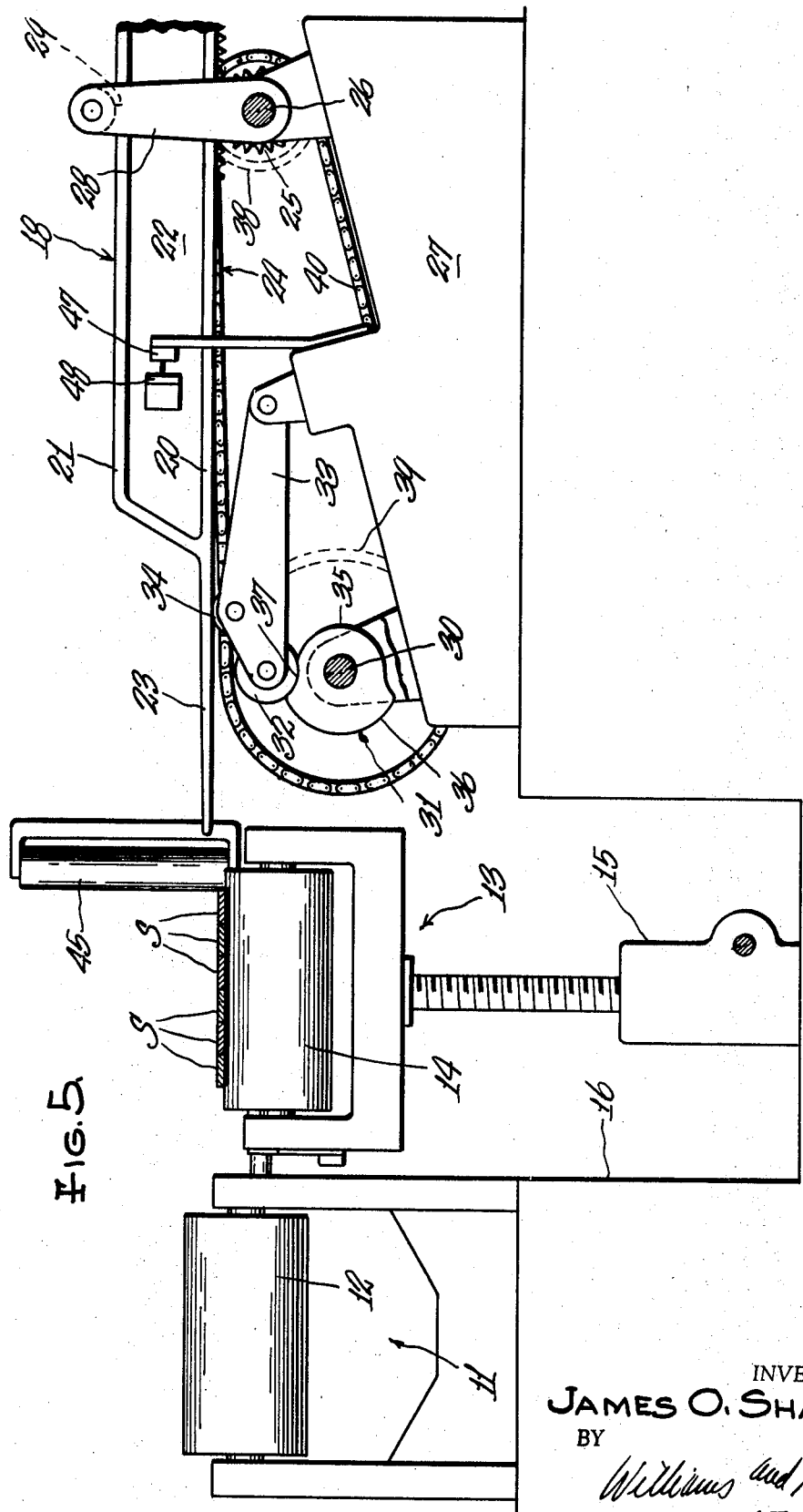

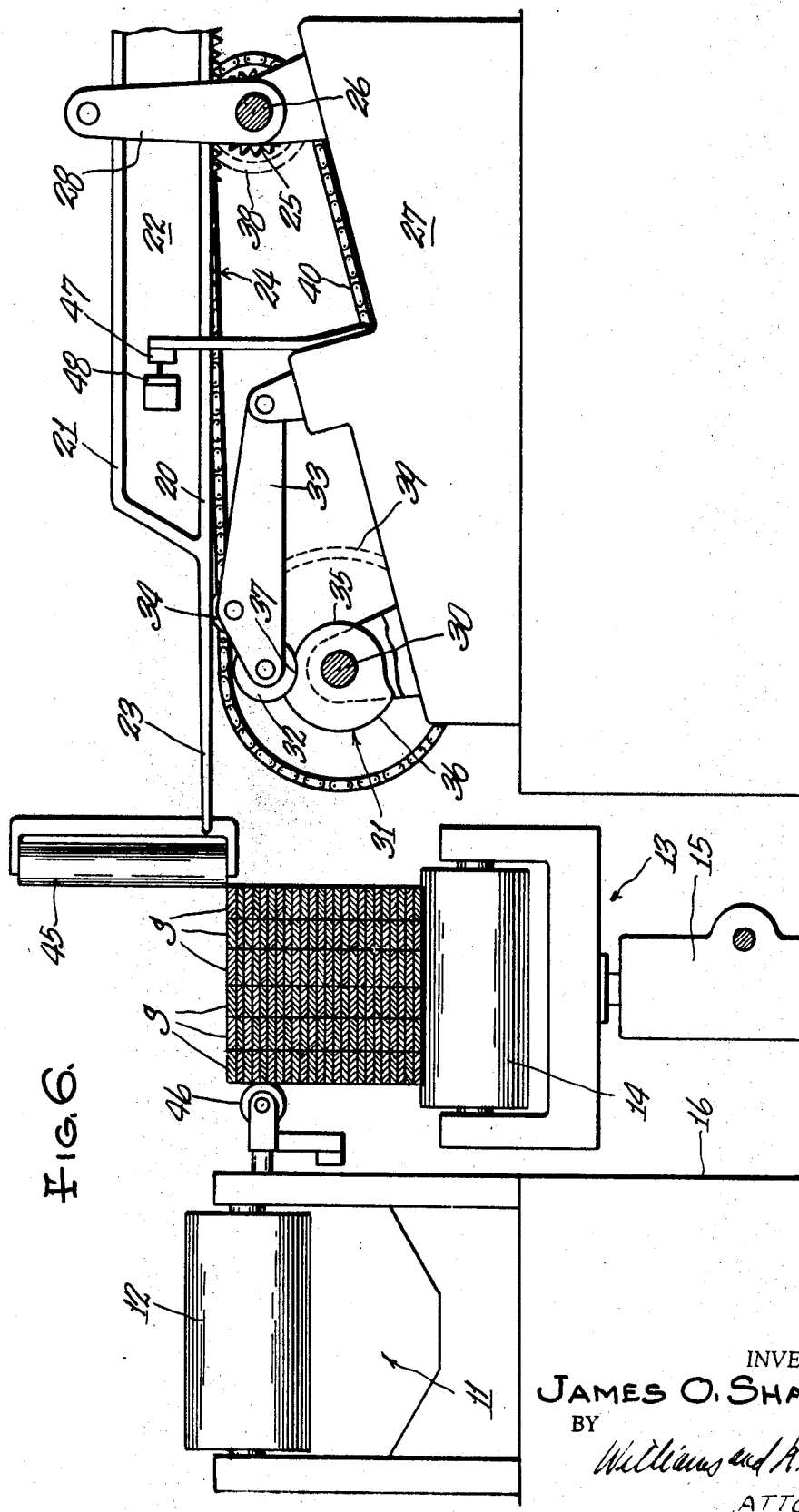

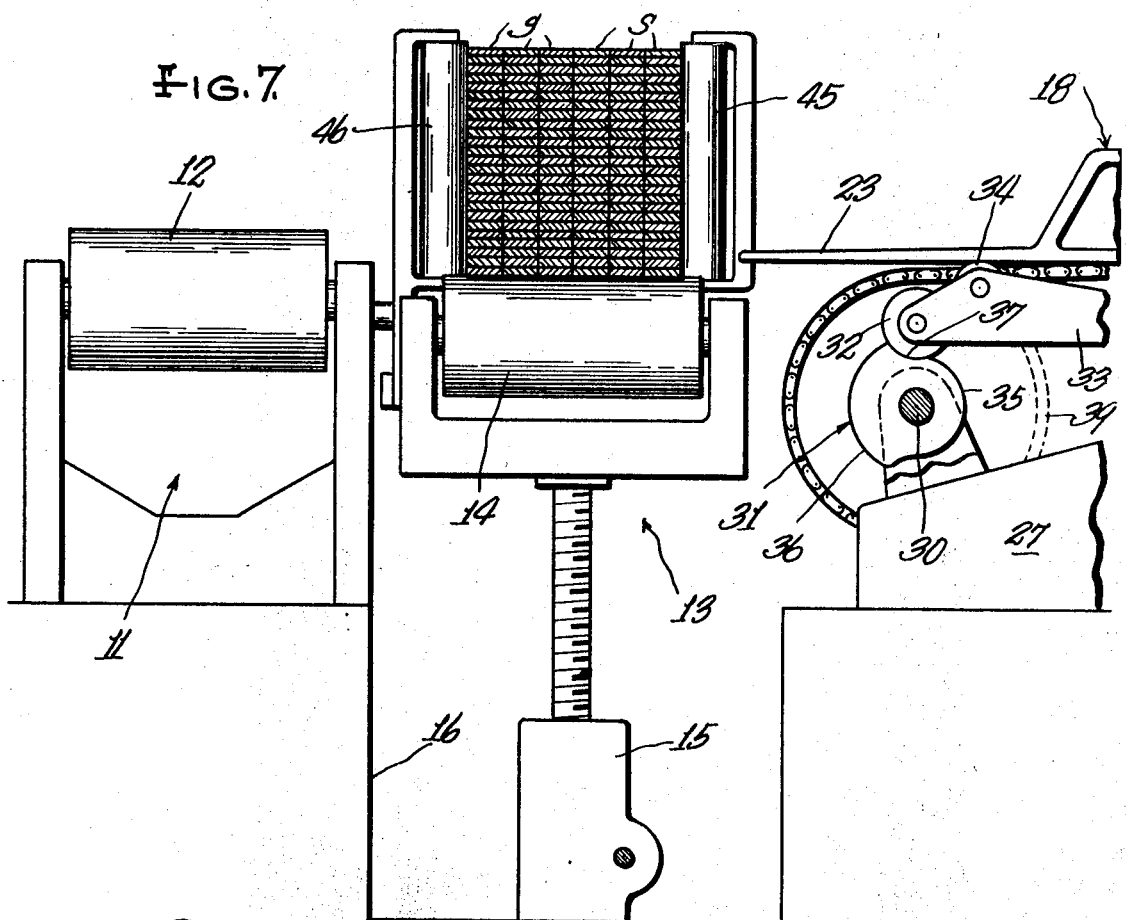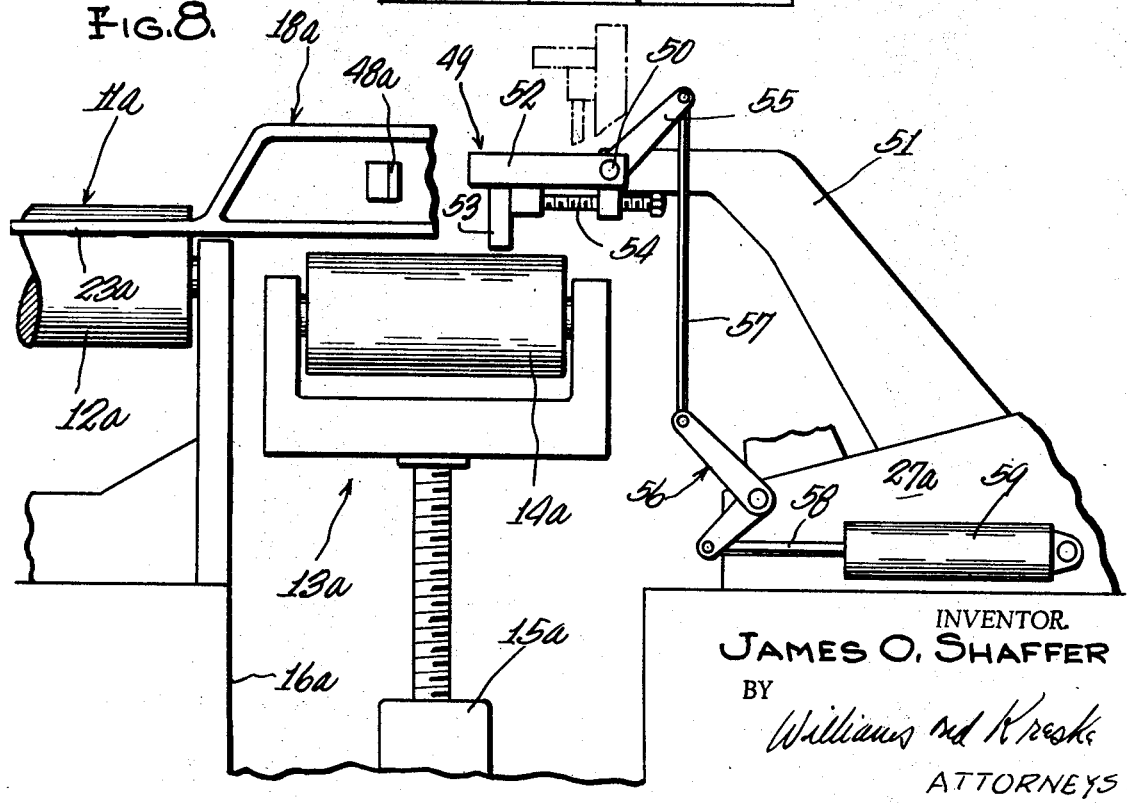

3,517,833
MEANS FOR TRANSFERRING AND STACKING ELONGATED MEMBERS
James O. Shaffer, Canfield, Ohio, assignor to Youngstown Foundry & Machine Company, Youngstown, Ohio
Filed July 5, 1968, Ser. No. 742,846
Int. Cl. B65g 57/10
U.S. Cl. 214—6                                       4 Claims

ABSTRACT OF THE DISCLOSURE

Apparatus in which a run-out table successively received longitudinally moving lengths of material for subsequent deposit in stacked relation on a stacking table which is in side-by-side relation with the run-out table. A transfer device lifts successive lengths of material from the run-out table, carries them transversely to position above the stacking table, and subsequently deposits them successively on the stacking table when transverse movement of the material lengths is interrupted during continuance of such transfer device movement.

PREAMBLE

In the manufacture of bars or other material lengths, such lengths are normally discharged longitudinally from the line and issue successively therefrom. In many cases, it is desired to group a number of such lengths together in a stack, or bundle, and in the past, this has been done by hand or by rather unsatisfactory apparatus. It is, therefore, an object of the present invention to provide simple, effective apparatus for successively stacking lengths of longitudinally moving material at high speed and with little or no attention by an operator. Other advantages will become apparent from a study of the following specification and from the appended drawings.

SUMMARY

The present invention comprises a novel transfer device which elevates a length of material from a run-out table, shifts such length transversely to position above a stacking table, deposits such material length on the stacking table, and returns to its original position to elevate and shift the next successive length of material from the run-out table to the stacking table. The transfer device comprises a pair of arms extending transversely of the material and spaced-apart longitudinally thereof, and such arms are movable in unison by means of cams, racks and pinions to both elevate and shift the material. The material lengths are deposited on the stacking table by the simple expedient of withdrawing the arms from beneath the material when the latter is in proper position for deposit above the stacking table, the latter being capable of being progressively lowered, as material is progressively stacked thereon, to maintain the top of the stack of material at a generally constant height.

DRAWING DESCRIPTION

FIG. 1 is a top plan view of apparatus embodying the invention,
FIG. 2 is an enlarged, sectional view generally corresponding to the line 2—2 of FIG. 1,
FIGS. 3 through 7 are views similar to FIG. 2 but showing the parts at various operational stages, and
FIG. 8 is a fragmentary view, similar to FIG. 2, but of another embodiment.

DETAILED DESCRIPTION

With reference to FIG. 1, 10 represents the discharge end of a line from which elongated lengths of material, such as bars, are being longitudinally discharged onto a run-out table 11 shown formed of rollers 12 in side-by-side, spaced-apart relation. While bars S are shown in FIG. 2 as being discharged onto the run-out table rollers in groups of six in side-by-side relation, it is to be understood that the bars may well be discharged individually or in larger or smaller groups. Moreover, while the apparatus herein shown is disclosed as handling bars, it is to be understood that such elongated material could as well be in the form of plates or sheets. In any event, it is to be understood that a group of lengths of material, or a single length, is discharged longitudinally onto the run-out table (from right to left as viewed in FIG. 1), and immediately thereafter, a following group, or length, is discharged thereonto.

Although not shown, the rollers 12 may be provided with drive means for effecting rotation thereof thus assisting movement of the bars S therealong as they are discharged from the line 10. Additionally such rollers may also be provided with brake means for terminating their rotation when each bar, or group of bars S, is entirely upon the rollers of the run-out table.

Disposed to one side of the run-out table 11 is a stacking table 13 formed of rollers 14 in side-by-side, spaced-apart relation. For a purpose to appear, rollers 14 are mounted on screw jacks 15 disposed within a pit 16 (see FIG. 2) whereby the rollers 14 constituting the stacking table 13 may be lowered in unison. With the rollers 14 in their uppermost position seen in FIG. 2, the top surface of the table provided thereby; that is, the upper peripheries of such rollers, is well below the upper peripheries of the run-out table rollers 12 for reasons to appear.

Extending transversely of the run-out tables 11, 13 are a plurality of elongated arms 17, 18 and 19 herein shown to be three in number (FIG. 1), which are spaced-apart from each other longitduinally of said tables. As best seen in FIG. 2, each of the arms 17, 18 and 19 has a generally I beam cross-section with a lower flange 20, an upper flange 21 and a web 22; however, at the left end, the lower flange 20 of each arm is extended to provide a relatively thin, tapered blade 23 which in the position of parts shown, underlies the upper surface of the run-out table 11.

Means are provided for simultaneously shifting the arms 17, 18 and 19 both longitudinally of their axes and for elevating and lowering their blade portions 23. To effectuate such arm movement, the underside of each arm is provided with rack teeth 24 which mesh with respective pinions 25 affixed to a shaft 26. Shaft 26 is journaled on respective stands 27 underlying respective arms. With the arrangement thus far disclosed, it will be understood that rotation of shaft 26 in a clockwise direction will simultaneously, via the pinions 25 and the rack teeth 24, effect movement of the arms 17, 18 and 19 to the right. Similarly, counter-clockwise rotation of the shaft 26 will effect simultaneous movement of the arms to the left.

In addition to shaft 26, stands 27 rotatably support a shaft 30 to which are secured respective cams 31 for rotation therewith. Cams 31 underlie respective arms 17, 18 and 19 adjacent the stacking table 13 and engaged with each cam are respective cam follower rollers 32 rotatably carried by respective pivotally mounted links 33. Each link 33 rotatably mounts rollers 34 which engage the underside of respective arms 17, 18 and 19 on opposite sides of its rack teeth 24. For a purpose to appear, each cam 31 has a small diameter portion 35, a large diameter portion 36, and a slightly depressed portion 37 intermediate the portions 35, 36, all of which are engaged by respective cam follower rollers 32. Although only one cam 31 is shown, it is to be understood that the cams are so orientated with each other that each of the followers 32 at all times engage corresponding portions of respective cams.

Means are provided for effecting rotation of shaft 30 with shaft 26 and as herein disclosed, a sprocket 38 is affixed to shaft 26 in alignment with a sprocket 39 on the shaft 30 and a chain 40 extends between and about such sprockets. For a purpose to appear, while sprocket 38 is unitary with its shaft 26, sprocket 39 is secured to its shaft 30 through a unidirectional clutch 41 (FIG. 1); accordingly, during rotation of sprocket 39 in one direction, shaft 30 will rotate in unison therewith. On the other hand, rotation of sprocket 39 in the opposite direction will not cause rotation of shaft 30 due to the operation of the clutch 41.

Means are provided for effecting movement of the arms 17, 18 and 19 in a manner later to be disclosed and as herein illustrated, such means is shown in FIG. 1 to comprise a fluid cylinder 42 having a piston rod 43 suitably secured to a bracket 44 carried by the arm 18. As piston rod 43 is extended, arm 18 will be shifted away from the run-out table 11; that is, to the right in the position of parts viewed in FIG. 2. As a result of the rack 24 on the arm 18 and the pinion 25 engaged therewith, such movement of the arm effects rotation of shaft 26 and rotation of the latter effects simultaneous and identical movement of the arms 17, 19 through their rack and pinion interconnection with the shaft 26. Movement of arm 18 in the opposite direction by the fluid cylinder 42 will, of course, cause identical and simultaneous movement of the arms 17, 19 therewith.

As best seen in FIG. 2, a pair of elongated, upright rollers 45 are positioned at the side of stacking table 13 which is spaced away from the run-out table 11 and are spaced from each other longitudinally of the stacking table. While no means for support of rollers 45 has been shown, it will be understood that such rollers could be mounted on suitable brackets secured to the stands 27, for example. Such rollers perform a dual function as will later be disclosed. A similar pair of elongated rollers 46 are disposed on the opposite side of the stacking table 13; however, as seen in FIG. 1, rollers 46 are pivotally mounted for movement from the normal, horizontal position seen in FIGS. 1 and 2 to the upright position seen in FIG. 7.

OPERATION

With the parts positioned as seen in FIGS. 1 and 2, plurality of bars S in side-by-side relation will emerge longitudinally from the line 10 and onto the run-out table 11. Note that the blade portions 23 of arms 17, 18 and 19 are at this time disposed beneath the upper surface of the rolls 12 so as not to interfere with bar movement aforesaid.

When the bars S are entirely upon the run-out table and preferably after they have come to a stop thereon, fluid cylinder 42 will be actuated to shift the arm 18, together with the arms 17, 19 which are movable therewith as previously described, to the right as viewed in FIG. 2. As the arms 17, 18 and 19 move to the right, the concomitant clockwise rotation of shaft 26 causes similar rotation of shaft 30 via the sprockets and chain 38, 39 and 40 and the undirectional clutch 41. Immediately upon clockwise rotation of shaft 30 the attached cams 31 will be shifted from the position of FIG. 2 to the position of FIG. 3 thus causing the cam followers 32 to ride out of their depressed cam portions 37 and onto the large diameter cam portions 36. This will rock the links 33 about their pivots and, through the link mounted rollers 34, raise the arms to the full line position of FIG. 3 thus lifting the bars S from the run-out table and moving them toward the stacking table.

Continued movement of the arms to the right will shift them to the phantom line position wherein the bars S, while still elevated, are approaching their desired position on the stacking table. Still further arm movement to the right and rotation of cams 31 will cause the cam followers 32 to drop to the small diameter cam portions 35 thus lowering the arms 17–19 and the supported bars to the position seen in FIG. 4.

As the now lowered arms 17–19 continue to move to the right, the supported bars S will be carried therewith to abutment with the upright rollers 45 which interrupt and prevent further bar movement in this direction. Accordingly, as arm movement continues, the blade portions of arms 17–19 will be withdrawn from beneath the bars thus allowing them to gravitate to the underlying rollers 14 of the stacking conveyor 13.

FIG. 5 illustrates the position of parts with the arms 17–19 fully shifted to the right wherein their blade portions 23 are well-spaced from the adjacent bar supported on the stacking table. Note that at this time, cams 31 have been rotated to their initial positions wherein the followers 32 are once again seated in respective cam depressions 37.

With the parts positioned as seen in FIG. 5, any suitable means may be employed to cause cylinder 42 to shift the arms 17–19 to the left to the position of FIG. 2 once again. During such arm return movement, shaft 30 and the cams 31 will not be rotated because of the unidirectional clutch 41 on the sprocket 39; accordingly, the arms 17–19 will move straight across, being neither raised nor lowered, from the position of FIG. 5 to the position of FIG. 2.

The means presently employed to effect reversal of movement of the arms 17–19 constitutes a limit switch 47 mounted on a bracket secured to the stand 27 underlying the arm 18. The latter mounts a lug 48 which, in the position of parts seen in FIG. 5, engages the actuator of switch 47 to effectuate the above described reversal of operation of the fluid cylinder 42. In addition to the foregoing, switch 47 also performs another function: Each time the position of FIG. 5 is reached, switch 47 will initiate operation of screw jacks 15 to lower the stacking table rolls 14 an amount generally equal to the thickness of the bars being deposited thereon.

With the parts positioned as seen in FIG. 2 once again, the above cycle of operation will be repeated when the next group of bars are in position on the run-out table and such operational cycles will continue until a stack of bars of the desired size has been formed on the stacking table 13 as shown in FIG. 6.

When the desired size stack of bars thus formed on the table 13, the rollers 46 will be shifted by any suitable means from their horizontal positions seen in FIG. 6 to their upright position seen in FIG. 7. Screw jacks 15 will now be operated to raise the rolls of the stacking conveyor 13 to their initial positions thus elevating the stack of bars as shown. Rollers 14 may now be rotated to move the bar stack to a banding or other work position thus freeing the stacking table 13 for successive reception of bars which will form another stack.

While three arms 17–19 and two pair of rollers 45, 46 are herein shown, it will readily be apparent that a greater or lesser number may be used depending upon the length of the run-out and stacking tables 11, 13 respectively, and upon the degree of support and guidance deemed necessary.

The embodiment of the invention seen in FIG. 8 is similar to that heretofore described; accordingly, corresponding parts are identified by the same reference characters as before but with the suffix $a$ added. In this embodiment, the previously described upright rollers 45 have been omitted and a part of their function has been taken over by a stripping mechanism 49 which presently comprises a shaft 50 extending longitudinally of the stacking table 13a and journaled in spaced brackets 51 mounted on adjacent stands 27a. Secured to the shaft 50 in spaced-apart relation are slides 52 from which depend abutments 53 which are movable longitudinally of respective slides. A threaded member 54 provides for positioning of respective abutments 53 along respective slides. Secured to shaft 50 is a lever 55 whose free end is connected to one leg of a bellcrank 56 by means of a link 57. The other end of the bellcrank 56 is connected to the piston rod 58 of a fluid cylinder 59.

With the stripping mechanism 49 positioned as seen in full lines, abutments 53 are disposed for engagement with the material lengths as they are shifted to the right by the arms 17a, 18a and 19a to thus strip such material from the arm blade portions 23a in the same manner as did the upright rollers 45 in the embodiment of FIGS. 1 through 7. Note that by rotation of screws 54, the position of abutments 53 along the slides 52 may be varied to thus vary the transverse location at which the material lengths are deposited on the stacking table 13a.

When use of the mechanism 49 is not required or, when its full line position would interfere with elevation of the stacking table when a stack of material is disposed thereon, cylinder 59 may be actuated to shift the mechanism 49 about the shaft 50 to its phantom line position by means of the piston rod 58, bellcrank 56, link 59 and lever 55 in a manner which will be apparent. Operation of cylinder 59 in the opposite manner, of course, will return the parts for their full line position illustrated.

I claim:
1. Apparatus for stacking successive lengths of longitudinally moving, elongated material and including a run-out table for initially receiving successive lengths of material and a stacking table in side-by-side relation with said run-out table, the improvement comprising a transfer device for shifting successive lengths of material transversely from position on said run-out table to position on said stacking table, said transfer device having a pair of arms extending transversely of said tables and spaced-apart longitudinally thereof, said arms being unitarily movable transversely of said tables and in one position having material-engaging portions disposed beneath material supported on said run-out table and shiftable to engage beneath said material and elevate it above said run-out table, and in another position said material-engaging portions being disposed above said stacking table, and means interconnecting said arms to provide for their unitary movement aforesaid, including a rack mounted on each of said arms, and a rotatably supported member extending transversely of said arms and having pinions rotatable therewith and engaged with respective racks said arms being swingable about the axis of said rotatably supported member to provide for so shifting said arms.

2. The construction according to claim 1 wherein a rotatably mounted cam effects the aforesaid shifting of said arms, and wherein a driving connection between said rotatably mounted member and said cam provides for rotation of the latter in synchronization with arm transverse movement aforesaid.

3. The construction of claim 2 wherein said driving connection is unidirectional whereby said cam is rotated by said rotatably mounted member solely during rotation of the latter in one direction.

4. The construction of claim 1 wherein said arms are shiftable upwardly from said one position to engage beneath material supported on said run-out table and elevate said material above said table, wherein sad rotatably supported member is disposed on the side of said stacking table remote from said run-out table, wherein a rotatably mounted cam effects the aforesaid shifting movement of said arms and is positioned intermediate said rotatably mounted member and said stacking table, and a driving connection between said rotatably mounted member and said cam provides for rotation of the latter in synchronization with arm transverse movement, said arms and the material supported thereby being transversely shiftable to a further position wherein said material engaging portions are spaced from said stacking table on the side remote from said run-out table, and wherein abutment means is positioned in the path of and interrupts transverse movement of said material on said arm portions when such material is positioned above said stacking table, continued transverse movement of said arms to said further position causing said arm portions to slide from beneath said material thus allowing gravitation of the latter to said underlying stacking table.

References Cited

UNITED STATES PATENTS

| 1,556,695 | 10/1925 | Kronborg. |
| 2,915,202 | 12/1959 | Aitken. |
| 2,928,559 | 3/1960 | Mosely. |
| 3,050,199 | 8/1962 | McGrath et al. |
| 3,122,241 | 2/1964 | Lawson. |
| 3,298,683 | 1/1967 | Stroud 271—88 X |
| 3,393,812 | 7/1968 | Mayo et al. |

GERALD M. FORLENZA, Primary Examiner

R. J. SPAR, Assistant Examiner

U.S. Cl. X.R.

271—84